United States Patent [19]

Ishima et al.

[11] Patent Number: 6,044,384

[45] Date of Patent: Mar. 28, 2000

[54] DOCUMENT PROCESSING APPARATUS

[75] Inventors: Hiroyuki Ishima; Tsuyoshi Tanaka, both of Nakai-machi, Japan

[73] Assignee: Fuji Xerox Co., Ltd., Tokyo, Japan

[21] Appl. No.: 08/733,608

[22] Filed: Oct. 18, 1996

[30] Foreign Application Priority Data

Jan. 31, 1996 [JP] Japan .................................. 8-037207

[51] Int. Cl.[7] .............................. G06F 17/00; G06T 11/00
[52] U.S. Cl. .......................................... 707/517; 345/342
[58] Field of Search ................................... 707/517, 526, 707/530, 509, 500, 102, 515, 104, 508; 345/526, 333, 342

[56] References Cited

U.S. PATENT DOCUMENTS

| | | | |
|---|---|---|---|
| 5,079,624 | 1/1992 | Sasuga et al. | 358/75 |
| 5,608,857 | 3/1997 | Ikeo et al. | 395/761 |
| 5,634,021 | 5/1997 | Rosenberg et al. | 395/353 |
| 5,778,402 | 7/1998 | Gipson | 707/530 |
| 5,875,265 | 2/1999 | Kasao | 382/229 |

FOREIGN PATENT DOCUMENTS 2-64871    2/1990   Japan .
2-158865   6/1990   Japan .

*Primary Examiner*—Joseph H. Feild
*Assistant Examiner*—Alford W. Kindred
*Attorney, Agent, or Firm*—Oliff & Berridge, PLC

[57] ABSTRACT

A document data processor system includes means for evaluating a user's impression of a layout of a document, and means for storing the evaluation information. The system also includes means for storing document design knowledge regarding the layout of multiple standard documents. The system allows a user to create a new document based on the stored document design knowledge and the stored evaluation information so that new documents are created in accordance with user's desires, as reflected by previous document evaluations. In addition, a draft document that is being created may be re-formatted based on a user's evaluation of the draft.

10 Claims, 16 Drawing Sheets

| DOCUMENT NUMBER | DOCUMENT NAME | SUBJECT INDIVIDUAL | NAME OF USE |
|---|---|---|---|
| 199509121015 | INTERIM. REPORT | ISHIKAN | GENERAL PRESENTATION |

FIG.4

| NAME OF USE | DESIGN NAME |
|---|---|
| SUMMARY PRESENTATION | DESIGN 1 |
| GENERAL PRESENTATION | DESIGN 2 |
| DETAILED PRESENTATION | DESIGN 3 |

FIG.5

| DOCUMENT NUMBER | DESIGN NAME | DOCUMENT |
|---|---|---|
| 199509120945 | DESIGN 1 | ............................................ |
| 199509121321 | DESIGN 2 | ............................................ |
| 199509121503 | DESIGN 3 | ............................................ |

| DOC NO. | EVALUATOR | ENTIRE IMRESSION | SIZE OF CHARACTER | AMOUNT OF CONTENT |
|---|---|---|---|---|
| 199509121321 | REIKO FUJI | 0 | 0 | 0 |

FIG.8

| ENTIRE IMPRESSION | EVALUATION VALUE |
|---|---|
| GOOD | +1 |
| ORDINARY | 0 |
| POOR | −1 |

| CHARACTER SIZE | EVALUATION VALUE |
|---|---|
| TO BIG | +1 |
| GOOD | 0 |
| TOO SMALL | −1 |

| DOCUMENT CONTENT | VALUE |
|---|---|
| TOO MUCH | +1 |
| GOOD | 0 |
| TOO FEW | −1 |

FIG.9

| DOC NO. | EVALUATOR | ENTIRE IMRESSION | SIZE OF CHARACTER | AMOUNT OF CONTENT |
|---|---|---|---|---|
| 199509121321 | REIKO FUJI | -1 | 0 | -1 |

FIG.10

| DESIGN NAME | CHARACTER SIZE | CHARACTER SIZE EVALUATION | HIERARCHICAL LEVEL | HIERARCHICAL LEVEL EVALUATION | ENTIRE IMPRESSION EVALUATION |
|---|---|---|---|---|---|
| DESIGN 1 | LARGER | 0 | SIMPLE | 0 | 0 |
| DESIGN 2 | MEDIUM | 0 | STANDARD | 0 | 0 |
| DESIGN 3 | SMALL | 0 | DETAILED | 0 | 0 |

FIG.11

| CHARACTER SIZE | CHARACTER SIZE SET |
|---|---|
| LARGE | 1 |
| MEDIUM | 2 |
| SMALL | 3 |

FIG.12

| HIERARCHICAL LEVEL | NO. OF HIERARCHIES |
|---|---|
| SIMPLE | 2 |
| STANDARD | 3 |
| DETAILED | 4 |

FIG.13

| CHARACTER SIZE SET | CHARACTER SIZE HIERARCHICAL LEVEL 1 | CHARACTER SIZE HIERARCHICAL LEVEL 2 | CHARACTER SIZE HIERARCHICAL LEVEL 3 | CHARACTER SIZE HIERARCHICAL LEVEL 4 |
|---|---|---|---|---|
| 1 | 48 | 36 | 24 | 18 |
| 2 | 36 | 24 | 18 | 14 |
| 3 | 24 | 18 | 14 | 12 |

FIG.14

| EVALUATOR | DESIGN NAME | ENTIRE IMPRESSION | SIZE OF CHARACTER | AMOUNT OF CONTENT |
|---|---|---|---|---|
| REIKO FUJI | DESIGN 2 | −1 | 0 | −1 |

FIG.15

| DOC NO. | EVALUATOR | ENTIRE IMRESSION | SIZE OF CHARACTER | AMOUNT OF CONTENT |
|---|---|---|---|---|
| 199509121321 | REIKO FUJI | 0 | 0 | −1 |

| DESIGN NAME | CHARACTER SIZE | CHARACTER SIZE EVALUATION | HIERARCHICAL LEVEL | HIERARCHICAL LEVEL EVALUATION | IMPRESSION EVALUATION |
|---|---|---|---|---|---|
| DESIGN 1 | LARGER | 0 | BRIEF | 0 | 0 |
| DESIGN 2 | MEDIUM | 0 | STANDARD | -1 | -1 |
| DESIGN 3 | SMALL | 0 | DETAILED | 0 | 0 |

FIG.22

DOCUMENT PROCESSING APPARATUS

BACKGROUND OF THE INVENTION

1. Field of the Invention

The present invention relates to a document processing apparatus which creates, edits, and evaluates documents. Particularly, the present invention relates to a document processing apparatus which enables the creation or editing of a document using document design knowledge that regulates the layout of the document, and which updates the document design knowledge by using the evaluation data of the document.

2. Description of Related Art

Creating and editing documents has been accomplished using functions, such as a word processor, to make the documents easier to read. In addition, apparatuses that evaluate the layout of the documents have been proposed.

In a document evaluation system described in publication JP Laid-Open Patent Application 2-158865, if an evaluator inputs an evaluation proper value, using evaluation means, to a document stored in the memory means, an evaluation result for the document is displayed on a display screen. However, in this document evaluation system, the evaluation proper value for the document can be made into a value desired by the evaluator, but the evaluation result is only displayed on the display screen and is not related to the document to be created as data.

Moreover, a presentation supporting system described in the publication of JP Laid-Open Patent Application 2-64871 displays a document which is based on evaluation rules provided in the system, displays the evaluation result, and appropriately corrects and uses the evaluation rules based on the information relating to the status of executing the presentation. However, in this presentation supporting system, evaluations corresponding to the status of executing the presentation, such as the size of meeting rooms and time, can be accomplished, but are only provided to the creator of the document. In addition, not only do the evaluation results not reflect evaluations of the document readers, but they are not related, in data, to the documents to be created.

As described above, in the document evaluation apparatuses provided by the related art, evaluation data, such as the preferences of the document creator or the reader, or the ease of understanding, is not related to documents to be created, and the evaluation results could not be effectively used for documents to be created in the future. As a result, in the conventional document evaluation apparatus, the created documents are only evaluated with certain standards, and are not created with layouts appropriate to the desire of the user, as a device system.

SUMMARY OF THE INVENTION

The present invention addresses the problems associated with the related art. Thus, it is an object of the present invention to provide a document processing apparatus which executes the documents while incorporating the evaluation information, such as the preferences of the document creator or the reader, or ease of understanding.

In addition, it is another object of the present invention to provide a document processing apparatus which creates documents with high quality by using design knowledge appropriate to the status of the user by updating the document design knowledge that regulates the layout of the document in response to the evaluation data. In order to achieve the above objectives, the document design knowledge regulating the layout of the document to be created is stored in a document design knowledge memory means, and the document design knowledge stored in the document design knowledge memory means and the document have a corresponding document design knowledge corresponding means. Then, when the evaluation information reflecting the user's impressions regarding the layout of the document is input from the evaluation data inputting means, a document design knowledge updating means updates the document design knowledge stored in the document design knowledge memory means, based on the evaluation data.

Under the present invention, the document design knowledge is related to the document to be created, in terms of data, and reflects the evaluation of the user. Therefore, documents with high quality can always be created with a layout appropriate to the status of the user, such as the preferences of the user or in terms of ease of understanding.

In addition, as to the layout of the document according to the present invention, not only is the position of the structural elements, such as paragraphs composing the document, included in the document, but other structural elements, such as sizes and the number of the structural elements, sizes or fonts of characters, the number of characters in one paragraph, the length of one sentence, the ratio of Hiragana (Japanese alphabet) or Kanjis (Chinese characters), and an amount description, are included as well.

Moreover, in the document processing apparatus related to the present invention, the evaluation data input by the evaluation data input means is stored in an evaluation data memory means corresponding to the document design knowledge, and the document knowledge updating means updates the evaluation data stored in the evaluation data memory means based on the evaluation data input by the evaluation data input means. Furthermore, the document design knowledge stored in the document design knowledge memory means is updated when the updated evaluation data exceeds a specified threshold value.

Consequently, the above-described document design knowledge reflects the user's evaluation with a standard based on a threshold value. Thus, it is possible to create documents with high quality and with layouts appropriate to the user's preferences, ease of understanding, or status of the user, based on preset standards, such as the number of people who provided the same evaluation, or the number of times the same evaluation has been performed.

Furthermore, in the document processing apparatus according to the present invention, a plurality of document design knowledge is stored in the document design knowledge memory means. If the evaluation data shows the user's impression from the evaluation data input means, then the document design knowledge updating means updates the document design knowledge stored in the document design knowledge memory means based on the evaluation data. Subsequently, when creating the documents, the document design knowledge stored in the document design knowledge memory means is selected by a document design knowledge selection means, and a document is created by document creation means based on the selected document design knowledge.

Therefore, the documents are created by using the document design knowledge which reflects the user's evaluation.

As explained above, according to the present invention, the document design knowledge is updated by means of the evaluation data of the document evaluator, and because the document design knowledge which reflects the evaluation data in accordance with the desire of the evaluator, or in terms of ease of understanding and the like, is cumulatively handled when using a document editor, the document can easily be created which incorporates the easily understood evaluation data reflecting the desires of the evaluator. In addition, in order to update the design knowledge corresponding to the evaluation data, a high quality document can be created using document design knowledge applied to ordinary conditions of use.

BRIEF DESCRIPTION OF THE DRAWINGS

FIG. 4 shows the data construction of use information in accordance with the first embodiment of the present invention.

FIG. 5 is a diagram which shows the use name to design name correspondence table in accordance with the first embodiment of the present invention.

FIG. 6 is a diagram which shows the data construction of a converted document management unit in accordance with the first embodiment of the present invention.

FIG. 7 is a diagram which shows the evaluation data input screen in accordance with the first embodiment of the present invention.

FIG. 8 is a diagram which shows the data construction of the evaluation data in accordance with the first embodiment of the present invention.

FIG. 9 is a diagram which shows the correspondence table of the evaluation and the evaluation values relating to the first embodiment of the present invention.

FIG. 10 is a diagram which shows the evaluation data relating to the first embodiment of the present invention.

FIG. 11 is a diagram which shows the data construction of the document design knowledge in accordance with the first embodiment of the present invention.

FIG. 12 is a diagram which shows the character size collection correspondence table in accordance with the first embodiment of the present invention.

FIG. 13 is a diagram which shows the hierarchical level correspondence table in accordance with the first embodiment of the present invention.

FIG. 14 is a diagram which shows the layers/level character size correspondence table in accordance with the first embodiment of the present invention.

FIG. 15 is a diagram which shows the use name design name correspondence table in accordance with the first embodiment of the present invention.

FIG. 22 is a diagram which shows the updated document design knowledge in accordance with the first embodiment of the present invention.

DETAILED DESCRIPTION OF THE PREFERRED EMBODIMENTS

A document processing apparatus relating to an embodiment of the present invention is described hereafter with reference to drawings.

Figure 1:
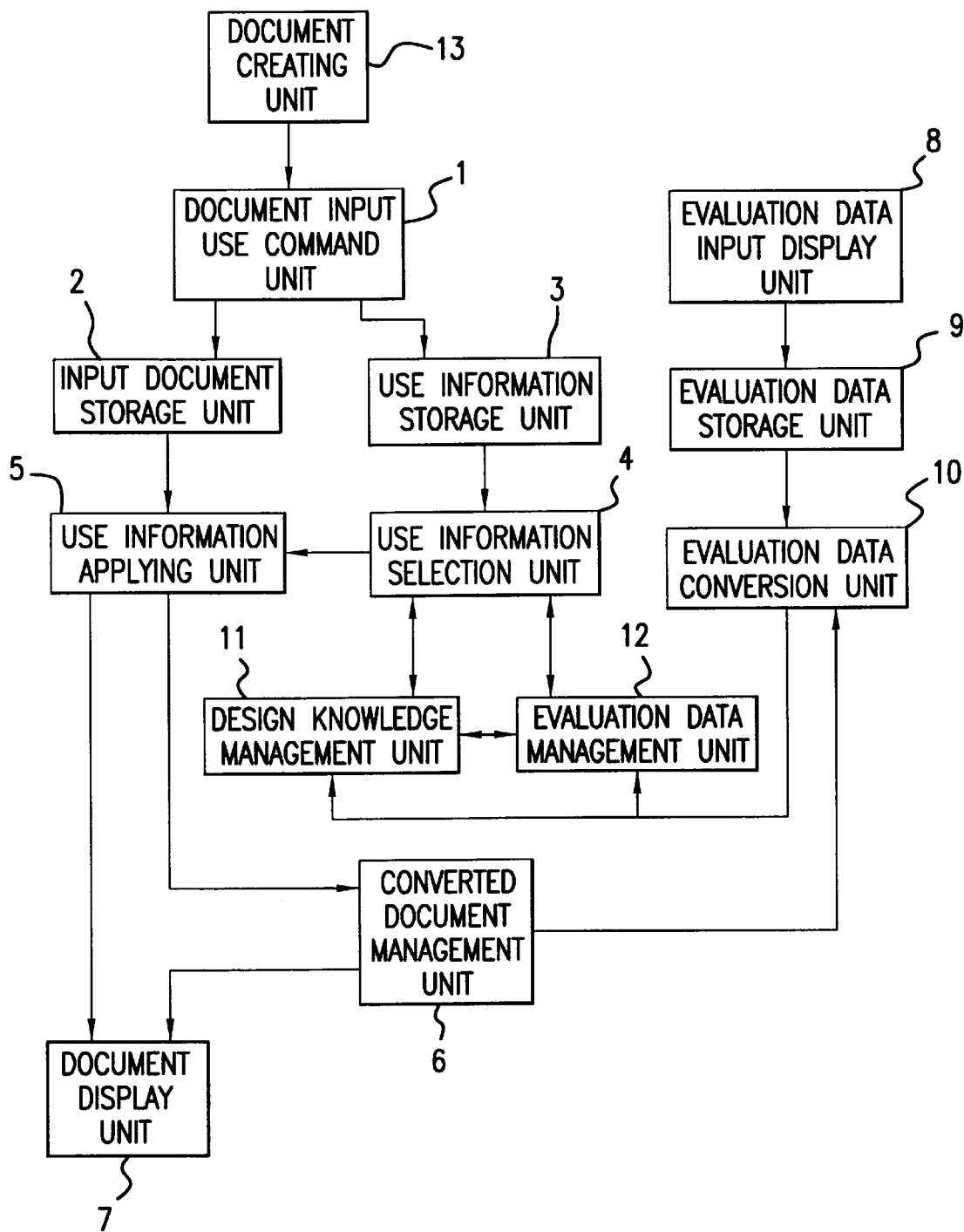
FIG. 1 is a compositional diagram of a document editor apparatus according to the first embodiment.

As shown in FIG. 1, the document processing apparatus in the present embodiment is composed of hardware, such as a personal computer, and software, such as a document processing program, as well as a document input use command unit 1, an input document storage unit 2, a use information storage unit 3, a use information selection unit 4, a use information applying unit 5, a converted document management unit 6, a document display unit 7, an evaluation data input display unit 8, an evaluation data storage unit 9, an evaluation data conversion unit 10, a design knowledge management unit 11, an evaluation data management unit 12, and a document creating unit 13.

The document input use command unit 1 is composed of command units, such as a keyboard and a mouse, and a means for inputting the document into the document processing apparatus and for commanding the use of the document. In addition, the document input use command unit 1 can include an editing function for documents prepared by general word processors. The document input use command unit 1 can input the document data from a storage medium by utilizing a device for inputting the document stored in the storage medium (e.g., a hard disk device, a floppy disk device, a CD-ROM device, etc.), or by inputting the document data from a network through a communication device. Moreover, the use information of the document can be either input independently from the document, or it can be input as a part of the document.

Figure 2:
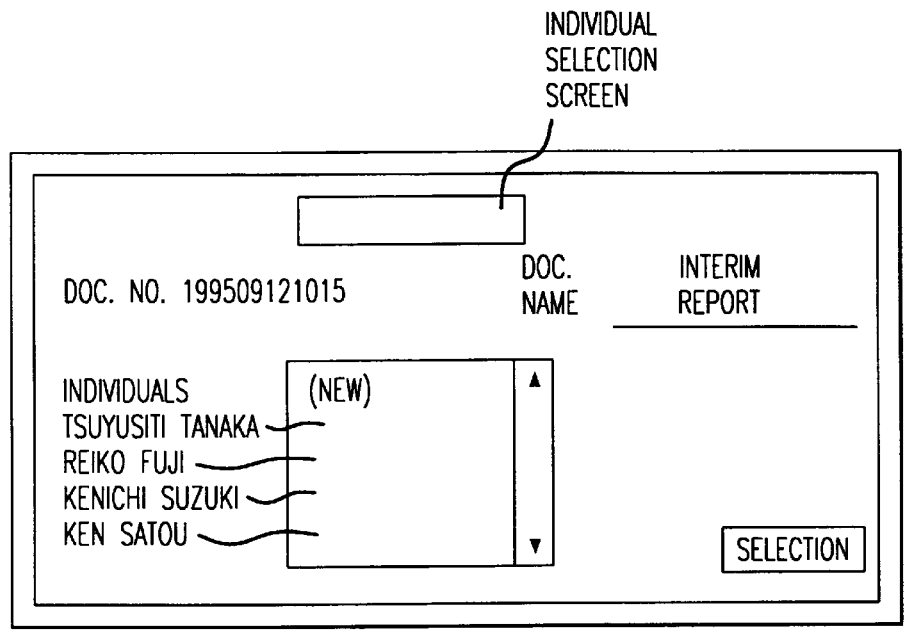
FIG. 2 is a diagram which shows an individual selection screen in accordance with the first embodiment of the present invention.
Figure 3:
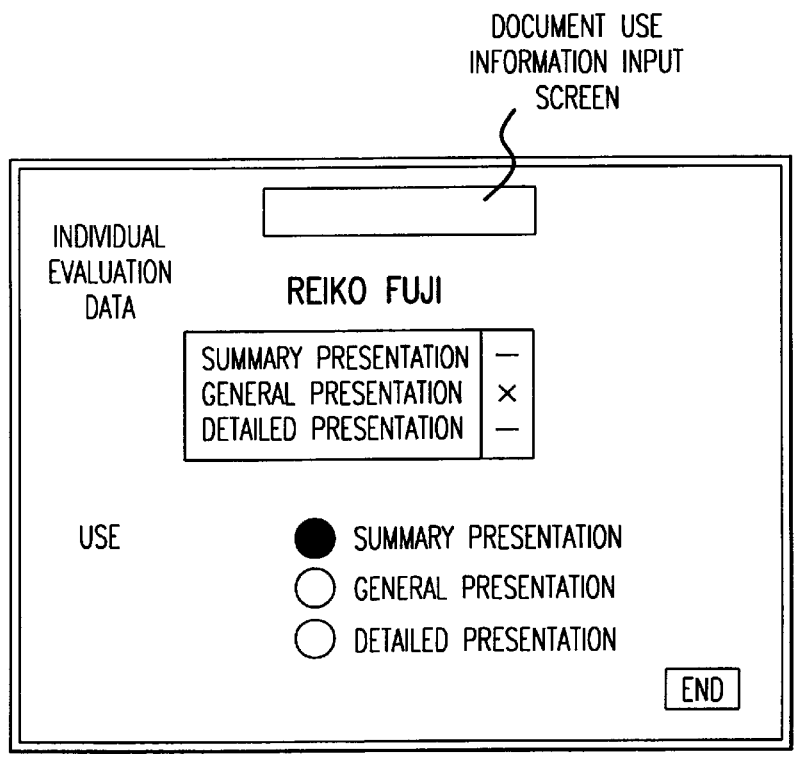
FIG. 3 is a diagram which shows the document use information input screen in accordance with the first embodiment of the present invention.

In the document input use command unit 1 of the present embodiment, a subject individual selection screen, shown in FIG. 2, and a document use information input screen shown in FIG. 3, are displayed on a display screen. Using the screen, necessary information is input to the document creators. That is, in the subject individual selection screen shown in FIG. 2, the name of a subject individual who evaluates a document is input with a document number and a document name thereof, and in the document use information input screen shown in FIG. 3, the evaluation data from the subject individual for the evaluation is displayed, and then the purpose of using the document is selected and input by the document creator.

The input document storage unit 2 is composed of a writeable/readable main memory device, a secondary memory device, or the like, and stores document data input by the document input use command unit 1.

The use information storage unit 3 is composed of a writeable/readable main memory device, a secondary memory device, or the like, and stores use information input by the document input use command unit 1. In addition, the use information storage unit 3 can be composed of both the input document storage unit 2 and the same memory device.

Regarding the use information storage unit 3 in the present embodiment, use information, including, for example, Document No. "199509121015", Document Name "interim report", Subject individual "Hiroyuki Ishima", and Name of Use "General presentation" as shown in FIG. 4, is stored. Moreover, in the use information storage unit 3, a use name to design name correspondence table shown in FIG. 5 is stored, and each document design corresponds to documents for each purpose of use.

The use information selection unit 4 selects the document design knowledge stored in the design knowledge management unit 11, which will be described later, based on the use information stored in the use information storage unit 3.

The use information applying unit 5 applies the document design knowledge selected by the use information selection unit 4 to the document data stored in the input document storage unit 2, and converts the document design related to the layout of the document composed of the document data for display on the document display unit 7.

The converted document management unit 6 has a writeable/readable memory device, such as a main memory device or a secondary memory device, and stores the input document data to which the document number and name of use were attached by the use information applying unit 5, with the construction shown in FIG. 6. The converted document management unit 6 also has a function which searches the stored document data by document number or by design name. Moreover, the storing device of the converted document management unit 6 can be composed in the same manner as the input document storage unit 2, the use information storage unit 3, or both the input document storage unit 2 and the use information storage unit 3.

The document display unit 7, composed of a display device or a printer device, displays a document composed of the document data stored in the converted document management unit 6.

The evaluation data input display unit 8 displays the document evaluation data input screen shown in FIG. 7 onto a display. Furthermore, the evaluator inputs the evaluation data of a document created by the document processing apparatus. That is, from the document evaluation data input screen, evaluation data relating to a document, such as the name of the evaluator, the overall impression of the document, sizes of the characters, and the amount of contents, is selectively input for a document recognized by its document number. The evaluator can be not only the responsible person for the evaluation, but also a reader or creator of the document.

The evaluation data storage unit 9 has a writeable/readable memory device, such as a main memory device or a secondary memory device, and stores the evaluation data input by the evaluation data input display 8. In the evaluation data storage unit 9 of the present embodiment, as shown in FIG. 8, the evaluation data is stored by document number, name of the evaluator, evaluations with respect to impressions of the entire document, size of characters, and amount of content, as they are fixed to evaluation values (in the figure, an interim evaluation indicates "0" corresponding to FIG. 7). Furthermore, the evaluation data storage unit 9 can have the same memory device as the input document storage unit 2, the use information storage unit 3, the converted document management unit 6, or all of the input document storage unit 2, the use information storage unit 3 and the converted document management unit 6.

The evaluation data conversion unit 10 converts the evaluation data which is recorded in the evaluation data storage unit 9 into data for reforming the document design knowledge which is accumulated in the design knowledge management unit 11, and at the same time as it stores the correspondence table of the evaluation content and the evaluation values necessary for conversion. In other words, using the evaluation content and the evaluation value correspondence table shown in FIG. 9, the evaluation data conversion unit 10 converts the evaluations of "good", "ordinary", and "poor" relating to the "overall impression" into evaluation values "+1", "0", and "−1", and converts the evaluations of "too big", "good", and "too small", relating to "character size" into the respective evaluation values of "+1", "0", and "−1", and the evaluations of "too many", "good", and "too few" relating to the "document content" into the evaluation values of "+1", "0", and "−1". The results are that when, for example, the evaluation relating to the "overall impression" is "poor", the evaluation relating to "character size" is "good", and the evaluation relating to the "document content" is "too little", as shown in FIG. 10, evaluation data is created which includes evaluation values relating to the overall impression, the character size, and the amount of content.

The design knowledge management unit 11 is formed by using, for example, a well known relational database management system, which manages the correspondence tables regarding compositional elements of a document, a collection of document design knowledges, which includes expression data and evaluation values of the compositional elements, a character size, and a hierarchical level, which indicates a number of hierarchical layers of sections in a document. In other words, as shown in FIG. 11, the collection of the document design knowledge includes the design name, the character size, and the hierarchical level as well as their evaluation values. The evaluation values are reformed in accordance with the evaluation performed by the evaluator. Furthermore, the design knowledge management unit 11 may be composed so as to share a memory device with the input document storage unit 2, the use information storage unit 3, the converted document management unit 6, the evaluation data storage unit 9, or a collection of all these units.

In addition, the design knowledge management unit 11 manages the storage of the correspondence table of the character size name and the character size collection shown in FIG. 12, the correspondence table of the hierarchical level and the number of hierarchical layers shown in FIG. 13, and the correspondence table of the number of character points for each layer and the character size collection such as is shown in FIG. 14. For example, when the hierarchical level is "detailed", and the character size is "large", the hierarchical number of layers of components, which constitute a document is "4", the character size is 48 points at the layer 1, 36 points at the "layer 2", 24 points at the "hierarchical level 3", and 18 points at the "hierarchical level 4".

The evaluation data management unit 12 separated by the evaluator has a primary storage apparatus and a secondary storage apparatus, or the like, which itself has a write to and readout recording apparatus, and evaluation data which is inputted by means of the evaluation data input display 8 is managed in correspondence with the evaluator and the design name shown in FIG. 15. Furthermore, the data management by the evaluation data management unit 12 may also be composed so as to make joint use of the input document storage unit 2, the use information storage unit 3, the converted document management unit 6, the evaluation data storage unit 9, the design knowledge management unit 11, or the same storage apparatus for a collection of the same.

The document creating unit 13 is a means which creates or edits the document. It is composed of an editor capable of designating a well known word processor, character font, or character size. In addition, the document creating unit 13 reflects the limitations of the document design knowledge which is managed by the design knowledge management unit 11, and creates the document on the basis of the document design knowledge selected by the use information selection unit 4.

Figures 16, 17:
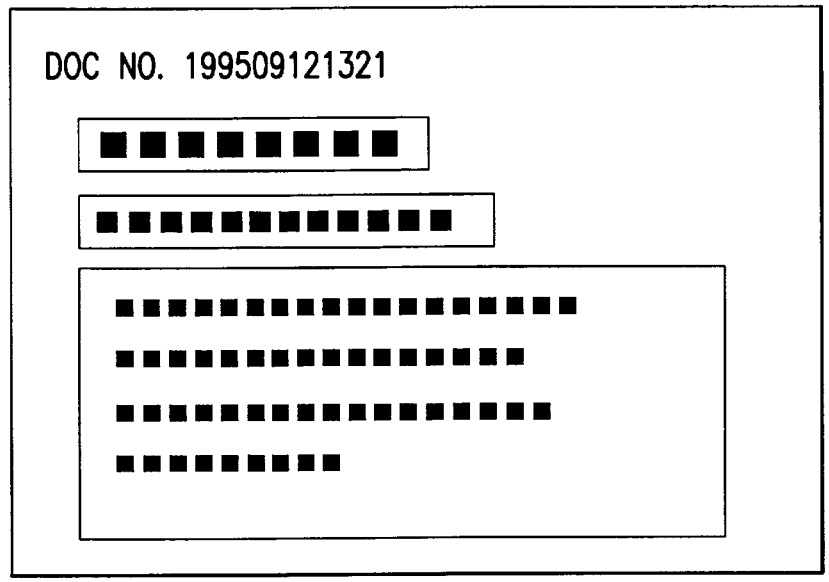
FIG. 16 is a diagram which shows an example of a created document.
FIG. 17 is a diagram which shows an example of the evaluation data of the reader.
Figure 18:
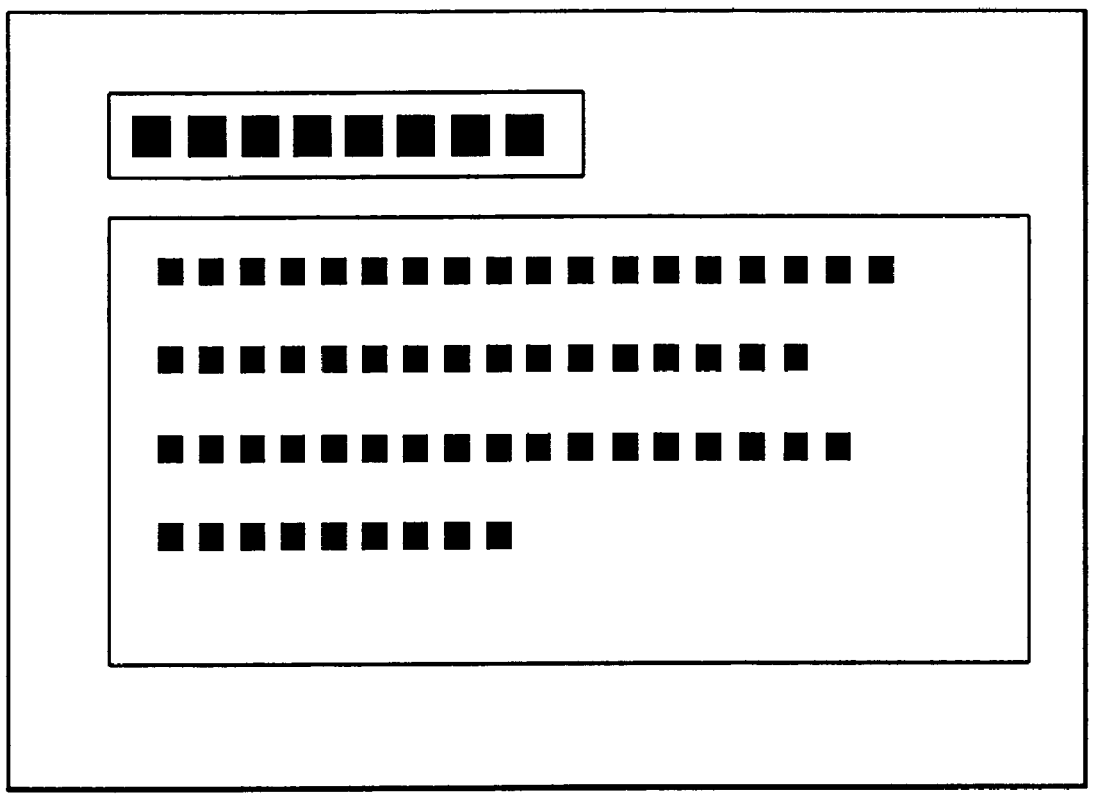
FIG. 18 is a diagram which shows an example of a newly created document in which the evaluation data is made.

Next, a summary is provided of the processes performed by a document processor constructed as indicated above, with reference to FIGS. 16 through 18.

As shown in FIG. 16, a document is initially created which has the three sections divided into the three layers and a document number for use by the reader. The document is then evaluated by the evaluator, (in the present example, REIKO FUJI). If the evaluation data shown in FIG. 17 is obtained, and when the document creator creates the document so that it can be used again or for the same reader, then the document design knowledge which was reformed by the evaluation data is utilized, and a document is created with a layout in which the number of layers shown in FIG. 18 is reduced by one.

In other words, according to the evaluation data, as it concerns the overall impression and character size, when the evaluation value is "0", where there is no problem, as concerns the amount of the content, the evaluation value becomes an evaluation of "−1". This evaluation data corresponds to the "too much" referred to in FIG. 9, and on the basis of this evaluation data, the document design knowledge is updated in the manner described hereafter. As a result, notwithstanding the creation of the document for reuse or for the use of the same reader, document processing is accomplished on the basis of document design knowledge which differs from the previous occasion, and a document is created with a layout wherein the number of layers is reduced by one.

In this instance, the characteristic processing in the present document processor is accomplished in the two scenes of use comprising a document creation scene for use by the creator of the document, and a document evaluation scene for use by the document evaluator, including the document creator.

Figure 19:
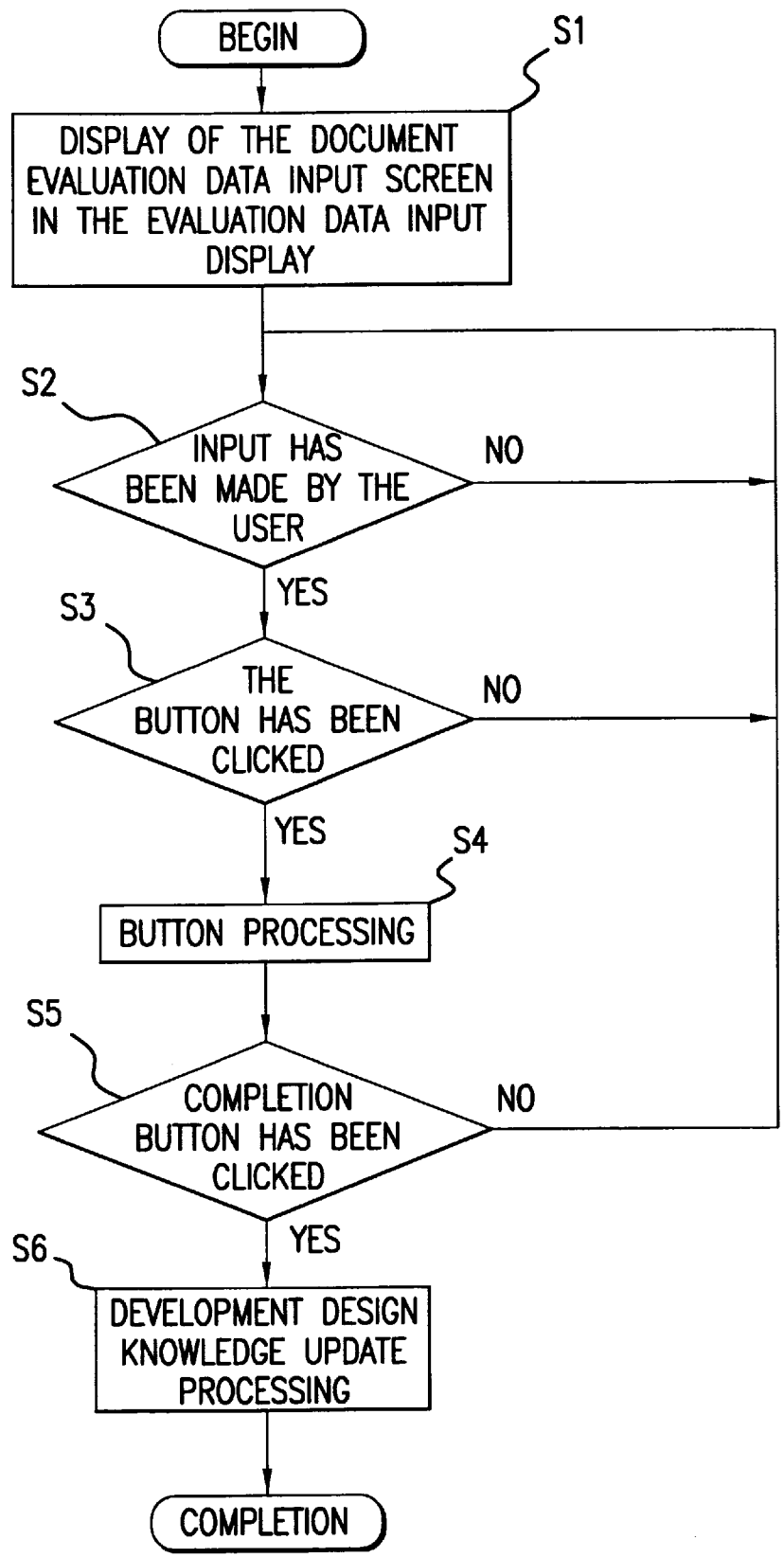
FIG. 19 is a flow chart which shows the input processing of the evaluation data in accordance with the first embodiment of the present invention.
Figure 20:
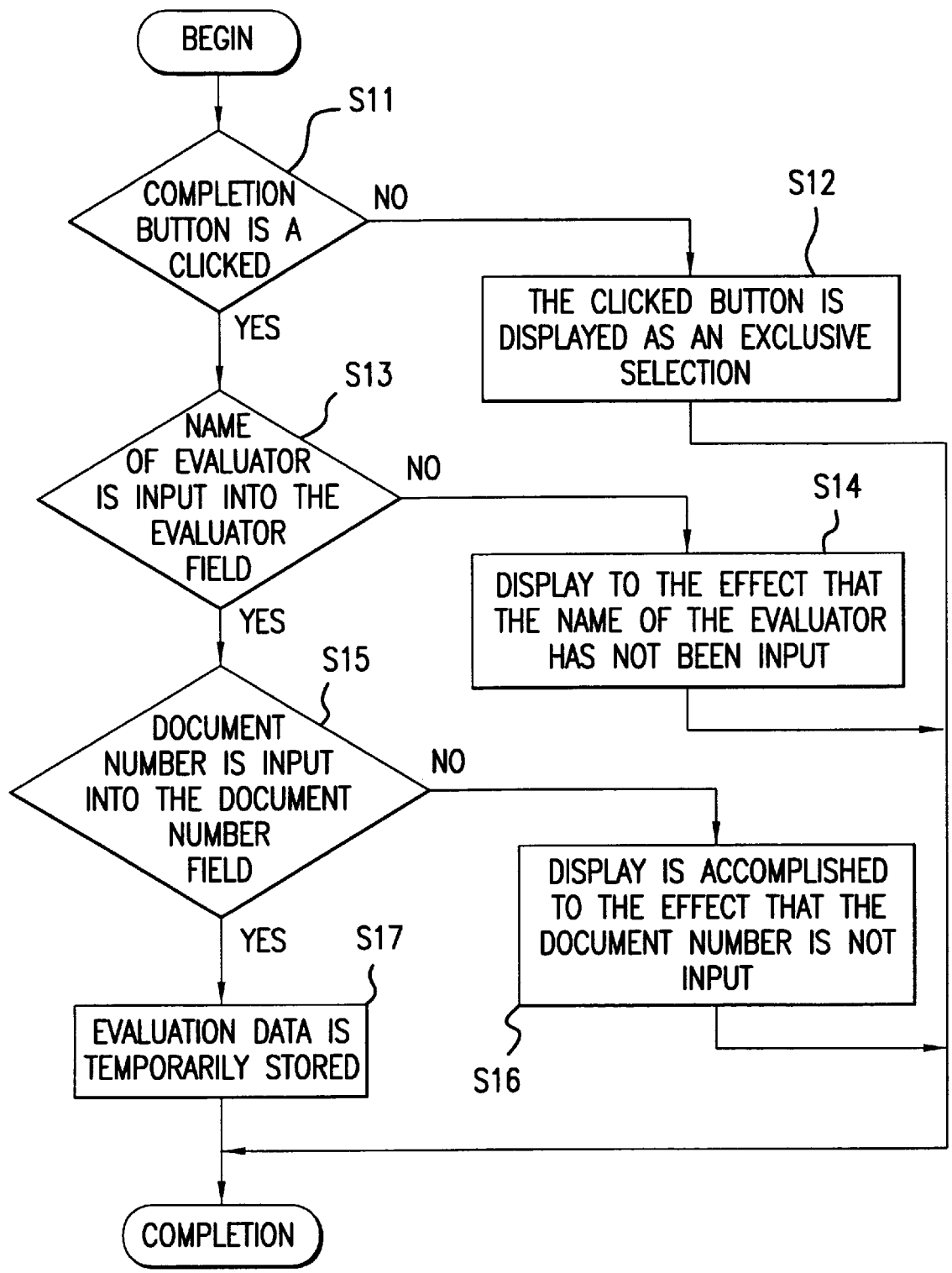
FIG. 20 is a flow chart which shows button processing in accordance with the first embodiment of the present invention.
Figure 21:
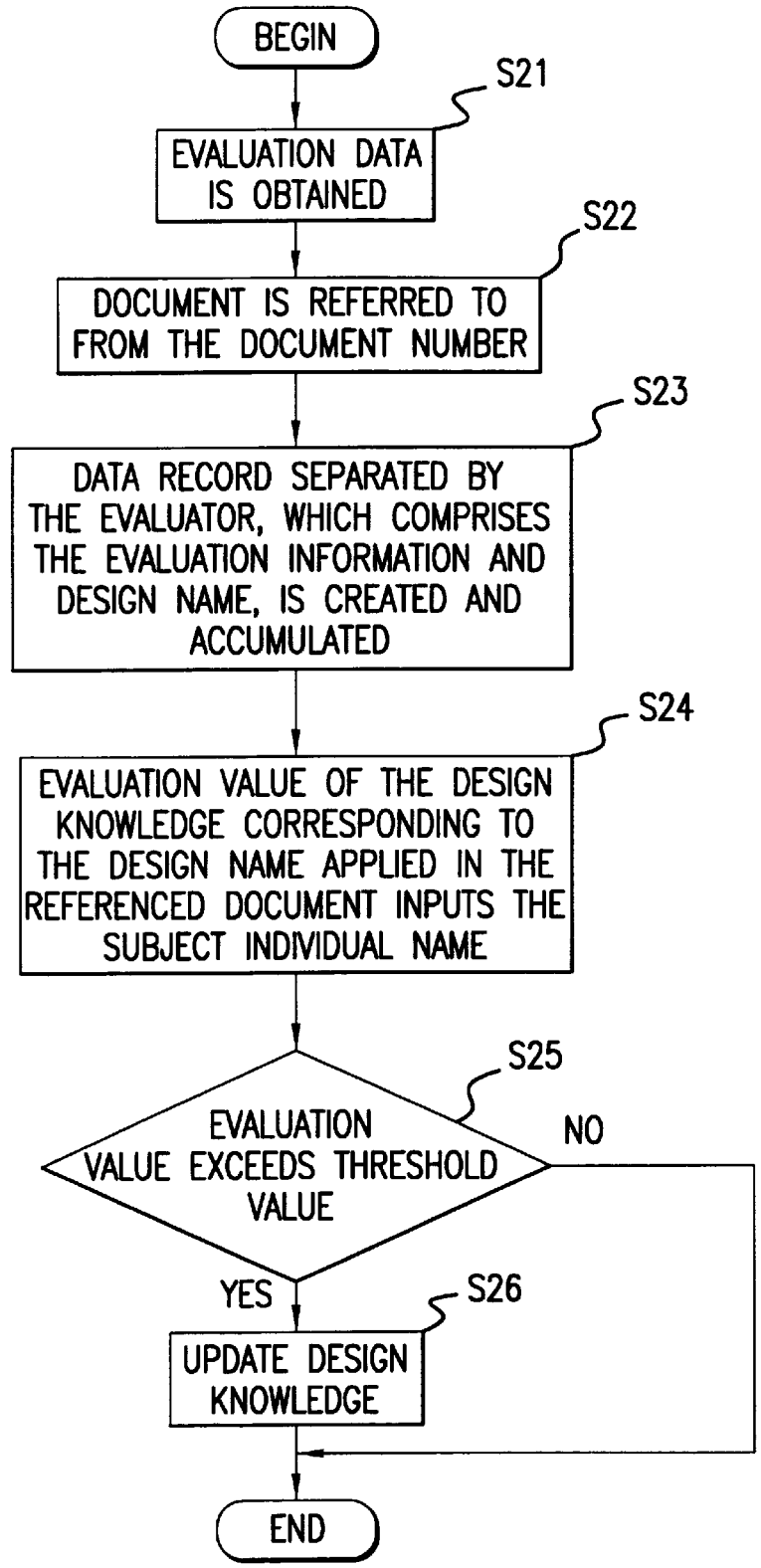
FIG. 21 is a flow chart which shows the document input use indicator.

An explanation is provided with reference to the flow chart shown in FIGS. 19 through 21 concerning the process operation of the document processor.

FIG. 19 shows the process flow of evaluation data input, wherein the document evaluation data input screen such as is shown in FIG. 7 is displayed (in Step 1) on the evaluation data input display 8. Next, a determination is made (in Step 2) as to whether or not there has been any input from the document evaluator, in the absence of which it continues to wait until there is an input.

Also, in the case where there has been an input, a determination is made (in Step 3) as to whether or not the buttons 21 through 23 have been clicked on by a mouse, or the like, to select the evaluation of "overall impression", "character size", and "amount of content" of the document evaluation data input screen shown in FIG. 7. If the button has not been clicked, then the program waits until clicking is accomplished. In the case where a button has been clicked on, processing is accomplished with reference to FIG. 20. Next, following the button process described above, a determination is made (in Step 5) as to whether or not the termination button 24 has been clicked on the document evaluation data input screen shown in FIG. 7. If it has not been clicked, then the program returns to the waiting state. On the other hand, if it has been clicked, then, as explained hereafter with reference to FIG. 21, update processing of the document design knowledge is accomplished and the processing of the evaluation data input is terminated (in Step 6).

As shown in FIG. 20, with the button process of Step 4 referred to above, a determination is made (in Step 11) as to whether or not the termination button 24 has been clicked on. If the termination button 24 has not been clicked on, then the button on the clicked document evaluation data input screen is exclusively and selectively displayed, and the button process is terminated (in Step 12). For example, in the item "overall impression" in FIG. 7, three buttons 21 are prepared comprising "good", "ordinary", and "poor". The user may make exclusive selection of any one of these three buttons. In the state shown in FIG. 7, the button 21 which shows "ordinary" is selectively displayed. Furthermore, if the user, for example, selects "good" by clicking the mouse on button 21, which shows "good", then the button 21 which displays "good" is selectively displayed.

On the other hand, in the case where the termination button 24 is clicked, determination is made (in Step 13) as to whether or not the evaluator name has been inputted into the evaluator field 25 shown in FIG. 7. In the case where the evaluator name has not been inputted, a display appears on the screen to the effect that an evaluator name has not yet been inputted, and the button processing is completed (in Step 14). When a name has been inputted into the evaluator field 25, a determination is made (in Step 15) as to whether or not the document number has been inputted into the document number field 26 shown in FIG. 7. In the case where the document number has not been inputted, then a display appears on the screen to the effect that the document number has not been inputted, and the button process is completed (in Step 16). Furthermore, the notification of the document number is provided from a display in the document, or is printed, or is indicated by the document creator, and the evaluator, or the individual inputting the evaluation data, specifies an evaluation subject document by inputting the document number.

In the case where the document number is inputted, then the evaluation data inputted by means of buttons 21 through 23, or in fields 25 and 26, is temporarily stored in primary memory, or secondary memory (in Step 17), and the button process is completed.

In addition, as shown in FIG. 21, with the document design knowledge update process of Step 6, initially, (Step 17) the temporarily stored evaluation data is obtained (in Step 21). This evaluation data becomes the content shown in, for example, FIG. 10, and the correspondence between the evaluation data and the evaluation values is determined by means of the correspondence table shown in FIG. 9.

Also, the document number within the obtained evaluation data is used as a reference key, and reference is made (in Step 22) to the document data which has accumulated in the converted document management unit 6. Furthermore, the referenced document data, as shown in FIG. 6, is composed of the document number, the design name, and the document content.

Next, the data record separated by the evaluator which forms the value of the design name included in the referenced document data and the evaluation data indicated above is accumulated (in Step 23) in the evaluation data management unit 12. This data by evaluator record, as shown in FIG. 15, includes the evaluator name, the design name, and the evaluation value of each evaluation item.

Also, utilizing the evaluation data obtained in Step 21, the evaluation value of the document design knowledge managed by the design knowledge management unit 11 is updated (in Step 24). The document design knowledge, as shown in FIG. 11, is composed of the design name, the character size, the character size evaluation, the hierarchical level, the hierarchical level evaluation, and the impression evaluation. For example, through the appropriate application of the evaluation data shown in FIG. 10, the evaluation value of the document design knowledge updated as shown in FIG. 22 is obtained. In other words, initially, from the document number of the evaluation data shown in FIG. 10, and by utilizing the data of the converted document management unit 6 shown in FIG. 6, a design means which is appropriately applied to the document specified by the document number is obtained. In this example, the obtained design name is "design 2" and from this design name a record is specified for the document design knowledge which should be updated, as shown in FIG. 22. Through the addition of the value of the evaluation data in the evaluation field of the record, the evaluation value of the document design knowledge is updated.

Next, a determination is made (in Step 25) as to whether or not the evaluation value of the document design knowledge exceeds a pre-established threshold. For example, if the threshold value of the hierarchical level evaluation value is −2 and +2, and if the evaluation value becomes −3 or +3, then it is determined that the threshold value has been exceeded.

As a result, if it has been determined that the evaluation value has exceeded the threshold value, then the document design knowledge is updated (in Step 26). For example, if the threshold value of the hierarchical level evaluation value is −2 and +2, and if the hierarchical level evaluation value in design 2 becomes −3, then a determination can be made that the document content is too much (in other words, the hierarchical level is too detailed). An update of the document design knowledge can therefore be achieved which reflects the evaluation data because the current design 2 hierarchical level of "standard" can be changed to "simple".

Furthermore, according to the present invention, the evaluation data can be immediately reflected in the document design knowledge without using a threshold value such as referred to above, in which instance, the updating of the document design knowledge can be accomplished without a determination as to whether or not the threshold value has been exceeded.

Figure 23:
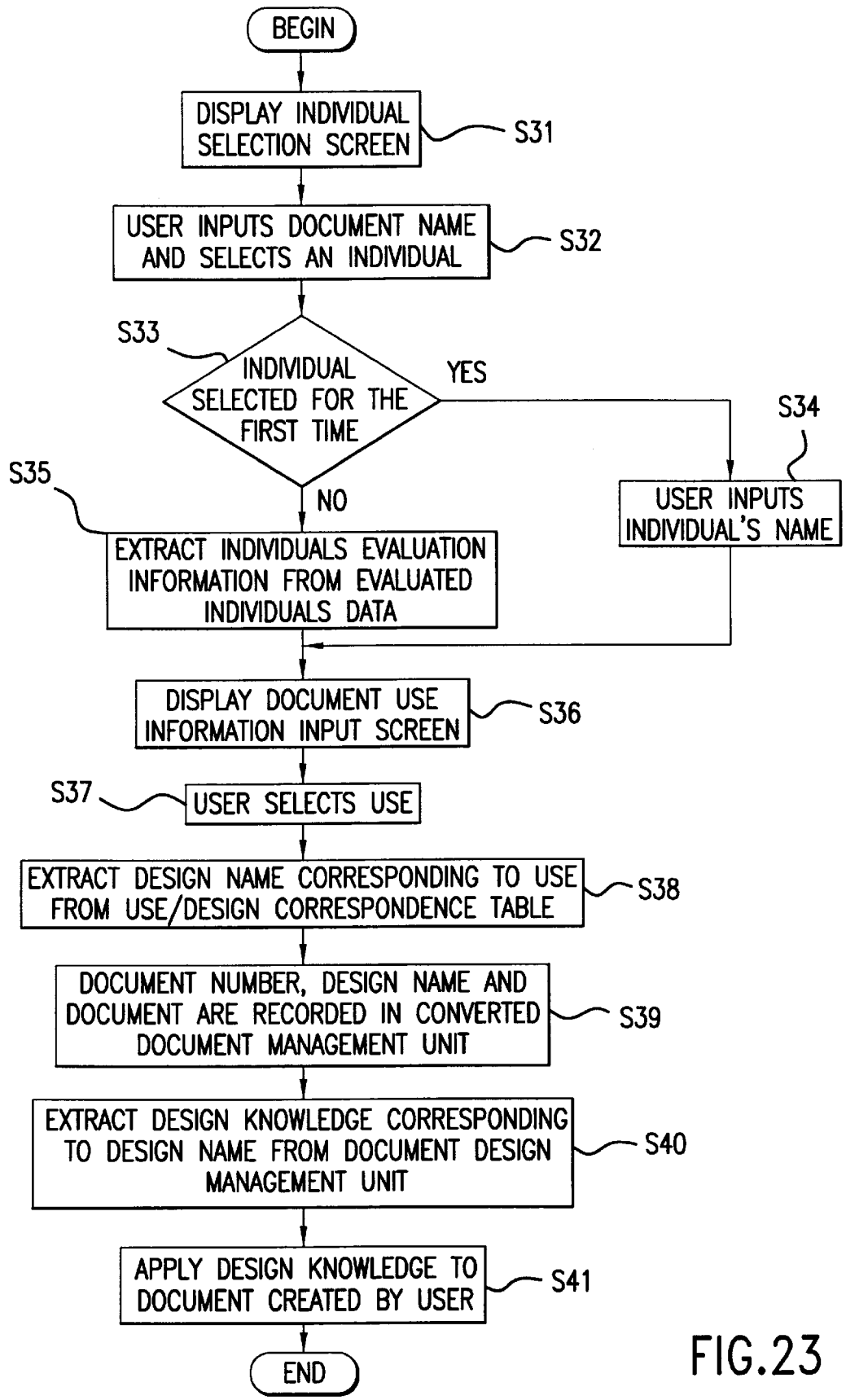
FIG. 23 is a flow chart which shows the input process of use information in accordance with the first embodiment of the present invention.

Next, within the characteristic processes in the present document processor, as concerns the processing operation of the document processing apparatus in the document processing scene by the document creator, an explanation is provided with reference to the flow chart shown in FIG. 23.

FIG. 23 shows a process flow chart describing the input of useable data in the present document processor apparatus. Initially, a subject individual selection screen such as is shown in FIG. 2 is displayed (in Step 31) in the document input use command unit 1. In addition to inputting the document name, the user selects and inputs the subject individual (in Steps 32, Steps 33, and Steps 34).

Furthermore, according to the present embodiment the document number is automatically applied by the document processor apparatus. However, the document number may be a meaningful item within the document processor, and may, for example, comprise numerals created from the date or time. In addition, in the subject list shown in FIG. 2, previously displayed were the names of the individuals accomplishing the evaluation of the document, using the present document processor. However, when facing a new subject, a selection is made (in Step 33) which displays the term "new" (or "first"). In the present embodiment, the name of a new subject individual is input (Step 34), but is not required. The input process of the subject names may be ended by selecting the section in which "new" (or "first") is displayed.

Previously, when selection was made of the subject accomplishing the evaluation, the evaluation data of the subject was obtained (in Step 35) from the data separated by evaluator shown in FIG. 15.

Next, the document use information input screen shown in FIG. 3 is displayed (in Step 36) in the document input use command unit 1, and its use to the user is selectively input (in Step 37). In this instance (in Step 32), when there is a previous subject for accomplishing the evaluation, the evaluation data of the subject is displayed on the document use information input screen, and the user, while referring to the evaluation data, can select its use.

In the example shown in FIG. 3, a report is displayed which has been prepared by the subject (REIKO FUJI), in which the (x) mark is displayed in the general presentation. With the evaluation data of the evaluator (REIKO FUJI) shown in FIG. 15, the mark is based upon the fact that the overall impression of design 2 is "−1" and where design 2 is usable, its correspondence to the general presentation is based upon the use name to design name correspondence table shown in FIG. 5. In addition, from the correspondence table of the evaluation, and evaluation value shown in the example of FIG. 9, the fact that the overall impression is "−1" is correspondingly shown to be a "poor" impression, and in the document use information input screen shown in the example of FIG. 3, it is displayed as a (x) mark. Furthermore, it does not need to be displayed as a (x) mark, but could also be displayed as, for example, "poor" and the like.

Furthermore, when the overall impression is "0", then from the correspondence table of evaluation and the evaluation value shown in the example of FIG. 9, since it is an "ordinary" impression, in FIG. 3, it is displayed as a "−". It may, however, also be displayed as "ordinary". In addition, in the case where the overall impression is "1", the (i) mark or "good" and the like is displayed because it is an impression of "good" then from the correspondence table of the evaluation and the evaluation values shown by the example in FIG. 9.

Next, the design name corresponding to the use name selected by the user is obtained (in Step 38) by referring to the use name to design name correspondence table shown by the example in FIG. 5. For example, if the use name is "general presentation", then as a design name, "design 2" is obtained.

Also, the document number, the design name and the document are registered (in Step 39) as a group in the converted document management unit 6. In the converted document management unit 6, the document number and the design name are managed for the purpose of registration by means of the construction shown in FIG. 6. Furthermore, what is referred to here as the document is something which the user created on another document editor in the converted document management unit 6. The document may also comprise the electronic document of the completed registration. It may also comprise electronic document which was newly created and registered in the converted document management unit 6.

Figure 24:
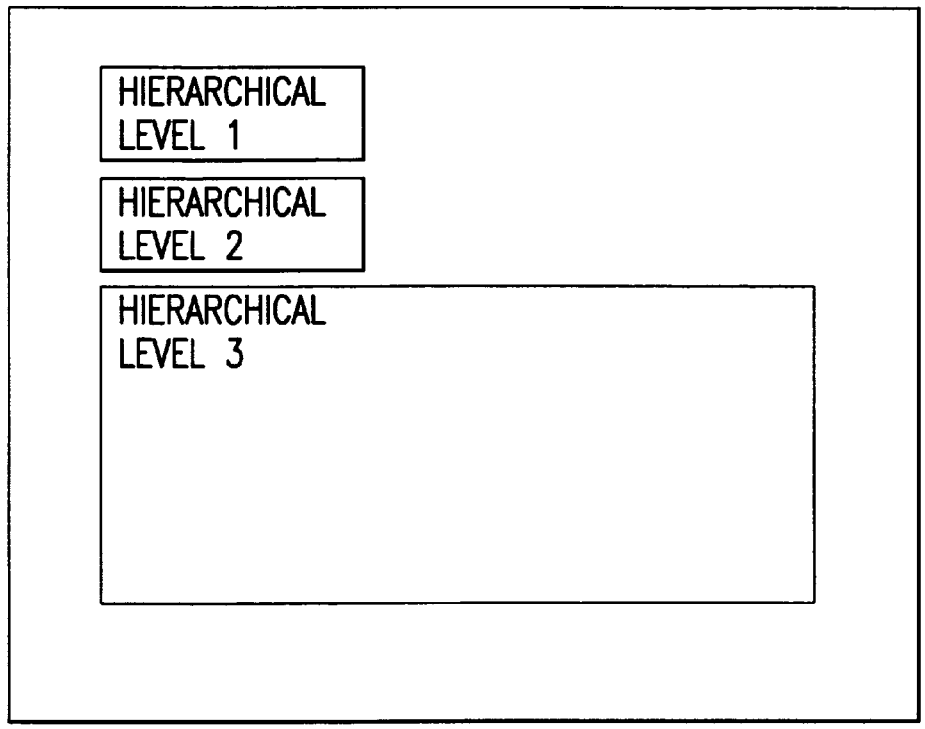
FIG. 24 is a diagram which shows an example of the document construction.
Figure 25:
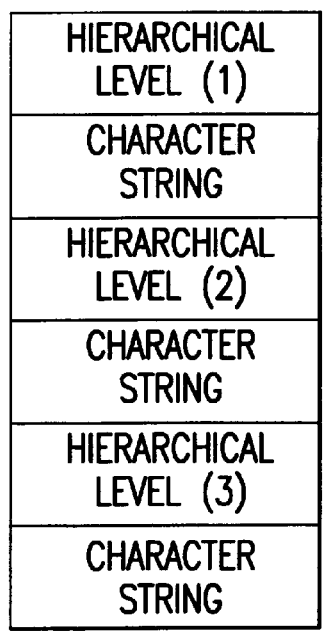
FIG. 25 is a diagram which shows an example of the data construction of a document.

Here, when creating electronic documents by means of another general document editor, as with the construction shown on the display, a description is provided for the construction like that shown in FIG. 24. For example, when design knowledge is accomplished in accordance with the present embodiment, a description is provided using a character size which differs from layer to layer. From the electronic document which is thus described, the design construction like that shown in FIG. 25 can be easily extracted, and the design knowledge can be appropriately applied to the present document processor relative to this construction. Furthermore, in the case where a new document is created after recording in the converted document management unit 6, another general document editing device can primarily be used. In addition, the document creating unit 13 that can edit along the limitation of the document design knowledge corresponding to the use selected by the user can also be prepared. For example, when the document design knowledge which defines the number of layers up to three is used, construction may be such that the document creating unit 13 limits the the number of layers to three.

The document design knowledge according to the present embodiment is somewhat simple and is formed from the hierarchical level and the character size. However, the document design knowledge utilized at the time of execution is not limited to this. Furthermore, when utilization is made of a complex document design knowledge, at this time it is desirable that a document creating unit 13 be prepared which is capable of describing appropriate document construction in the construction of the document design knowledge used because it is difficult to make use of another described general document editor which has a document which has construction which can reflect this document design knowledge. As concerns the document creating unit 13, this can be composed with known technology. For example, utilization may be made of a document editor which can describe the construction of the "Akane" (constructed document editor) manufactured by Fuji Xerox Company, LTD.".

Next, the document design knowledge corresponding to the design name from the design knowledge management unit 11 is obtained (in Step 40). This document design knowledge is composed from the primary construction shown in FIG. 11, and from the character size collection correspondence table shown in FIG. 12, the hierarchical level correspondence table shown in FIG. 13, and the layers/level character size correspondence table shown in FIG. 14. For example, the fact that the character size of the design name "design 2" is "medium" is specified in FIG. 11. The fact that the "medium" of the character size shows the character size collection "2" is specified in the collection correspondence table shown in FIG. 12. And finally, the character size of each layer in the character size collection "2" is specified in the hierarchical level character size correspondence table shown in FIG. 14.

Also, using the obtained document knowledge, the individual creating the document can make appropriate application of design knowledge in the created document. In other words, according to the present embodiment, in the case of document design knowledge, the character size of each hierarchy of created document is converted in accordance with the character design knowledge. For example, the size of the character string of layer 1 of the "general presentation" becomes the "character size 36" from the document design knowledge.

A detailed explanation has been provided of the document processor in accordance with the present invention on the basis of the embodiment. However, the present invention is not limited to this embodiment, and various changes and additions can be made using other embodiments executed within the parameters of the present invention. For example, according to the present embodiment, the document design knowledge comprises the two components of character size and hierarchical level, and the evaluation data comprises the three elements of character size evaluation, hierarchy order evaluation, and impression evaluation. However, within the parameters of the present invention, the document design knowledge can be made more detailed, or more simple.

What is claimed is:

1. A document processor comprising:

means for storing document design knowledge, said document design knowledge defining a layout of a document;

means for corresponding between said document and said document design knowledge stored in said document design knowledge storage means;

means for inputting evaluation data, said evaluation data indicating an impression of a user relative to an existing document layout; and means for updating said document design knowledge stored in said document design knowledge storage means based on said evaluation data input in the evaluation data input means.

2. A document processor according to claim 1, wherein the document design knowledge storage means further comprises means for storing evaluation data corresponding to the document design knowledge which is input from the evaluation data input means;

wherein the document design knowledge update means updates the evaluation data stored in the evaluation data storage means on the basis of evaluation data input from the evaluation data input means, at the same time it updates the document design knowledge stored in the document design knowledge storage means when updated evaluation data exceeds a specified threshold.

3. A document processor comprising:

means for standardizing a layout of a created document;

means for storing document design knowledge;

means for inputting evaluation data, said evaluation data indicating an impression of a user relative to the layout of an existing document;

means for updating the document design knowledge stored in the document design knowledge storage means on the basis of the evaluation data input from the evaluation data input means;

means for selecting document design knowledge stored in the document design knowledge storage means; and means for creating a document on the basis of the document design knowledge selected by the document design knowledge selection means.

4. A document processor according to claim 3, wherein the evaluation data comprises a user's impression of a printed image of a document.

5. A document processor according to claim 3, wherein the evaluation data comprises a user's impression of a size of characters of a document.

6. A document processor according to claim 3, wherein the evaluation data comprises a user's impression of an amount of information presented on a page of a document.

7. A document processing system, comprising:

a first memory for storing document design knowledge;

a second memory for storing data representing a document;

a third memory for storing document evaluation information that represents a user's impression of an existing document; and a processor that automatically updates the document design knowledge stored in the first memory based on evaluation information input to the third memory and creates document data based on the updated document design knowledge stored in the first memory and to store the created document data in the second memory.

8. A document processing system according to claim 7, wherein the processor is also updates existing document data stored in the second memory based on one of evaluation information input to the second memory and updated document design knowledge stored in the first memory.

9. A document processing system according to claim 7, wherein the evaluation information represents at least one of a user's impression of a printed copy of a document, a user's impression of a character size of characters of a document, and a user's impression regarding the amount of information presented on a page of a document.

10. A document processing system according to claim 7, wherein the processor is automatically updates the document design knowledge stored in the first memory based on evaluation information input to the third memory from multiple users.

* * * * *